United States Patent Office 3,073,824
Patented Jan. 15, 1963

3,073,824
DYESTUFFS CONTAINING NITRO AND ANTHRA-
QUINONE CHROMOPHORES AND A CHLORO-
TRIAZINE MOIETY
Raymond Gunst, Binningen, and Hans Wilhelm Liechti,
Oberwil, Switzerland, assignors to Ciba Corporation, a
corporation of Delaware
No Drawing. Filed Feb. 9, 1961, Ser. No. 88,016
Claims priority, application Switzerland Mar. 4, 1959
4 Claims. (Cl. 260—249)

The present application is a continuation-in-part of our copending application Serial No. 8,482, filed February 15, 1960 (now abandoned).

The present invention relates to new anthraquinone dyestuffs which contain both nitro and anthraquinone chromophores and which, like for example the dyestuff of the formula (1)
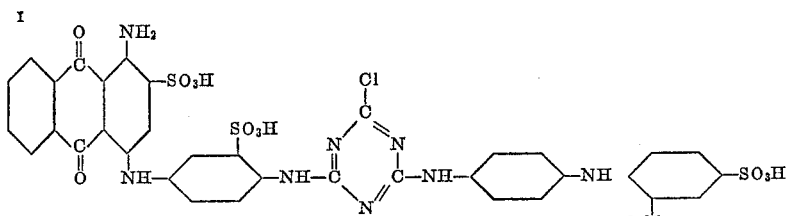

correspond to the general formula (2)
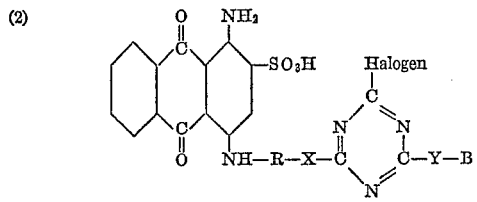

in which R stands for a benzene radical, X and Y each represent a nitrogen bridge and B the radical of an o-nitrodiarylamine which contains at least one sulfonic acid and/or one carboxylic acid group.

To prepare these dyestuffs a trihalogen-1:3:5-triazine, especially cynauric chloride, can be condensed in any order of succession on the one hand with an o-nitrodiaryl-amine which contains at least one sulfonic acid and/or one carboxylic acid group and at least one acylatable amino group, and on the other hand with an anthraquinone dyestuff on the formula (3)
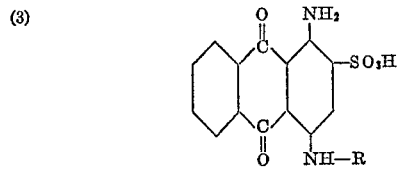

in which R stands for a benzene radical which contains an acylatable amino group, so that the resulting dyestuff condensation products contain a single reactive halogen atom.

As o-nitrodiarylamines of the type described there come into consideration as starting materials for the present process preferably o-nitrodiphenylamines of the formula (4)      $R_1$—NH—$R_2$—$NH_2$ in which $R_1$ and $R_2$ each represent a benzene radical and the two radicals $R_1$ and $R_2$ together contain at least one sulfonic acid and/or one carboxylic acid group.

The benzene radicals $R_1$ and $R_2$ may contain further substituents, such as for example alkyl groups, alkoxy groups and halogen atoms, and also sulfone groups and substituted sulfonamide groups.

The acylatable amino group bound to $R_2$ is preferably in meta- or para-position to the nitrogen bridge.

As examples of such o-nitrodiaryl-amino compounds the following may be mentioned:

4'-amino-2-nitrodiphenylamine-4-sulfonic acid,
4'-amino-2-nitrodiphenylamine-3':4-disulfonic acid,
3'-amino-2'-methyl-2-nitrodiphenylamine-4':4 - disulfonic acid,
4'-amino-3'-carboxy-2 - nitrodiphenylamine - 4 - sulfonic acid,
3'-amino-2'-methyl-2:4 - dinitrodiphenylamine - 4' - sulfonic acid,
4'-amino-2-nitro-4 - carboxydiphenylamine - 3' - sulfonic acid,
3'-amino-2-nitrodyphenylamine-2':4-disulfonic acid,

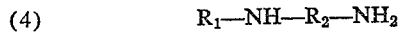

3'-amino-4'-methyl-2 - nitrodiphenylamine - 2':4 - disulfonic acid.

As anthraquinone dyestuffs of the type described there come into consideration as starting materials for the present process those which contain an acylatable amino group bound to the benzene nucleus R, particularly an $NH_2$-group; this amino group can be in meta-position to the —NH-group, or preferably in para-position, and the benzene nucleus can contain further substituents, such as alkyl groups or particularly an —$SO_3H$-group.

As examples of such anthraquinone dyestuffs which can be used as starting materials in the present process there may be mentioned:

1-amino-4-(4'- or 3'-aminophenylamino)-anthraquinone-2-sulfonic acid,
1-amino-4-(3'-amino-4'- or -6'-methylphenylamino)-anthraquinone-2-sulfonic acid,
1-amino-4-(4'-amino-3' - methylphenylamino) - anthraquinone-2-sulfonic acid,
1-amino-4-(3'-amino-4':6' - dimethylphenylamino) - anthraquinone-2-sulfonic acid,
1-amino-4-(4'-aminophenylamino) - anthraquinone - 3'-sulfonic acid diethylamide-2-sulfonic acid,
1-amino-4-(4'-aminophenylamino) - anthraquinone - 3'-methyl-sulfone-2-sulfonic acid, and
1-amino-4-(4'-aminophenylamino)-anthraquinone - 2:3'-disulfonic acid,
1-amino-4-(4'-aminophenylamino)-anthraquinone - 2:5-, -2:6-, -2:7- or -2:8-disulfonic acid,
1-amino-4-(3'-aminophenylamino)-anthraquinone - 2:4'-disulfonic acid,
1-amino-4-(5'-amino-2' - methylphenylamino) - anthraquinone-2:4'-disulfonic acid.

The condensations according to the present invention may be carried out in any order of succession.

All the condensations are advantageously carried out in an aqueous medium at a pH valued between 6 and 8. Depending on the choice of starting materials it can be an advantage to raise the pH value somewhat from step to step. As a rule it is advisable to keep the pH valued as constant as possible at the separate steps, which is possible by checking continually and neutralizing the hydrohalic acid liberated, for example by means of an alkali metal carbonate or alkali metal hydroxide.

The dyestuffs obtained by the present process are new. They are valuable dyestuffs which are suitable for dyeing and printing a wide variety of materials of fibrous structure, such as wool, silk, regenerated cellulose, such as viscose, linen or especially cotton. They are suitable for dyeing by the so-called direct dyeing method and particularly for printing and the pad steam process by which the dyestuffs are applied to the material to be dyed and then fixed, for example to cellulose fibers, by means of an acid-binding agent.

The dyeings obtained with the new dyestuffs on cellulosic fibers are, as a rule, distinguished by a good fastness to light and especially by an excellent fastness to washing.

The following examples illustrate the invention, the parts and percentages being by weight unless otherwise stated.

Example 1

18.6 parts of finely divided cyanuric chloride are suspended in 300 parts of ice and 200 parts of ice-water. A solution of 30.9 parts of 4'-amino-2-nitrodiphenylamine-4-sulfonic acid in 500 parts of water adjusted to pH 7.5 is added. The temperature is advantageously maintained between 5 and 10° C., the pH value between 8 and 6. After 30 minutes, condensation is complete. A solution of 48.9 parts of 4-(4'-amino-3'-sulfophenylamino)-1-aminoanthraquinone-2-sulfonic acid in 500 parts of water adjusted to pH 7.5 is added to the reaction mixture and the whole is stirred for 14 hours at 40 to 45° C. and at a pH value of 6.5 to 7.5. On the addition of sodium chloride the dicondensation product is precipitated, filtered and dried. The new dyestuff dyes cellulose fibers bluish olive tints which are fast to washing and light by the method described in Example 4.

Example 2

18.6 parts of finely divided cyanuric chloride are suspended in 300 parts of ice and 200 parts of ice-water. A solution of 48.9 parts of 4-(4'-amino-3'-sulfophenylamino)-1-amino-anthraquinone-2-sulfonic acid in 500 parts of water adjusted to pH 7.5 is added. The temperature is maintained between 0 and 5° C. and the pH value from 5 to 7. After 30 minutes, condensation is complete. A solution of 38.9 parts of 3'-amino-2-nitrodiphenylamine-6':4-disulfonic acid in 500 parts of water adjusted to pH 7.5 is added to the reaction mixture. The whole is stirred for 48 hours at 40 to 45° C. and at a pH value of 5 to 7. On the addition of sodium chloride the dyestuff is precipitated, filtered and dried. The new dyestuff dyes cellulose fibers pure greenish blue tints.

Example 3

18.6 parts of finely divided cyanuric chloride are suspended in 300 parts of ice and 200 parts of ice-water. A solution of 38.9 parts of 4'-amino-2-nitrodiphenylamine-3':4-disulfonic acid in 500 parts of water adjusted to pH 7.5 is added. The temperature is preferably maintained between 5 and 10° C., the pH value between 8 and 6. After 30 minutes, condensation is complete. A solution of 48.9 parts of 4-(3'-amino-4'-sulfophenylamino)-1-aminoanthraquinone-2-sulfonic acid in 500 parts of water adjusted to pH 7.5 is added and the whole is stirred for 48 hours at 40 to 45° C. and at a pH value of 5 to 6.5. The dyestuff is obtained as a powder by evaporating the reaction mixture at 50° C. under reduced pressure. The new dyestuff dyes cellulose fibers greenish grey tints by the method described in Example 4.

To obtain products with similar properties the following components are used:

| | Diphenylamine Derivative | Anthraquinone Derivative | Tint on Cotton |
|---|---|---|---|
| 1 | 3'-amino-2-nitrodiphenylamine-6':4-disulfonic acid. | 4-(3'-amino-4'-sulfophenylamino)-1-aminoanthraquinone-2-sulfonic acid. | Grey. |
| 2 | 4'-amino-2-nitrodiphenylamine-4-sulfanilide-3':4''-disulfonic acid. | 4-(4'-amino-3'-sulfophenylamino)-1-aminoanthraquinone-2-sulfonic acid. | Olive green. |
| 3 | 4'-amino-2-nitrodiphenylamine-4-sulfonic acid. | 4-(3'-amino-4'-sulfophenylamino)-1-aminoanthraquinone-2-sulfonic acid. | Greenish grey. |
| 4 | 4'-amino-2-nitrodiphenylamine-3':4-disulfonic acid. | 4-(4'-amino-3'-sulfophenylamino)-1-aminoanthraquinone-2-sulfonic acid. | Olive green. |

Example 4

18.6 parts of cyanuric chloride are finely suspended in 300 parts of ice and 200 parts of ice-water. There is then added a solution, adjusted to pH 7.5, of 35.3 parts of 4'-amino-3'-sulfo-2-nitrodiphenylamino - 4 - carboxylic acid in 500 parts of water. The temperature is advantageously kept between 5 and 10° C., and the pH between 6 and 6.5. After 30 minutes, the condensation is finished. A solution, adjusted to pH 7.5, of 48.9 parts of 4-(4'-amino-3'-sulfophenylamino) - 1 - aminoanthraquinone-2-sulfonic acid in 500 parts of water is added and the whole is stirred for 24 hours at 40–45° C. and at a pH of 6–6.5. An addition of sodium chloride precipitates the condensation product, which is then filtered off and dried. In the pad-dyeing method, the new dyestuff dyes cellulose fibers olive green shades that are fast to washing and light.

When instead of the 4'-amino-3'-sulfo-2-nitrodiphenylamine-4-carboxylic acid the isomeric 4'-amino-4-sulfo-2-nitrodiphenylamine-3'-carboxylic acid is used, a dyestuff with similar properties is obtained.

Example 5

18.6 parts of cyanuric chloride are suspended in 300 parts of ice and 200 parts of ice-water. There is added a solution, adjusted to pH 7.5, of 35.3 parts of 4'-amino-3'-sulfo-2-nitro-diphenylamine-4-carboxylic acid in 500 parts of water. The temperature is advantageously kept between 5 and 10° C., and the pH between 6.5 and 6. After 30 minutes the condensation is finished. A solution, adjusted to pH 7.5 of 48.9 parts of 4-(3'-amino-4-sulfophenylamino) - 1 - aminoanthraquinone-2-sulfonic acid in 500 parts of water is added and the whole is stirred for 24 hours at 40–45° C. and at a pH of 6 to 6.5. An addition of sodium chloride precipitates the condensation product, which is filtered and dried. In the pad-dyeing and exhaust processes the new dyestuff dyes cellulose fibers greenish gray shades which are fast to light and washing.

When instead of the 4'-amino-3'-sulfo-2-nitrodiphenylamine-4-carboxylic acid used in Example 5 the isomeric 4'-amino-4-sulfo-2-nitrodiphenylamine-3'-carboxylic acid is used, a dyestuff with similar properties is obtained.

Example 6

2 parts of the dyestuff obtained as described in Example 1 are dissolved in 100 parts of water. A spun rayon fabric is impregnated with the resulting solution so that its weight is increased by 75%, and then dried.

The fabric is then impregnated with a solution heated to 20° C. which contains per liter 10 grams of sodium hydroxide and 300 grams of sodium chloride; the fabric is then squeezed to a weight increase of 75%, steamed for 60 seconds at 100 to 101° C., rinsed, soaped for a quarter of an hour in a boiling solution of a non-ionic detergent of 0.3% strength, rinsed and dried.

An olive green dyeing fast to washing and light is obtained.

If a cotton fabric is used instead of the spun rayon fabric a similarly good result is obtained.

What is claimed is:

1. Anthraquinone dyestuff of the formula

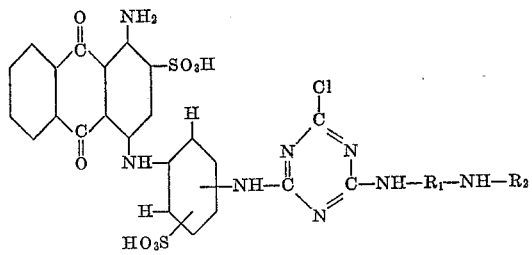

wherein $R_1$ is phenylene and the —NH— groups of —NH—$R_1$—NH— are in one of the relationships meta and para with respect to each other, and $R_2$ is o-nitrophenyl, $R_1$ being further substituted by a member selected from the group consisting of sulfo and carboxy in a position para to —NH—, and $R_2$ being further substituted by a member selected from the group consisting of sulfo and carboxy in a position meta to —NH—.

2. Anthraquinone dyestuff of the formula

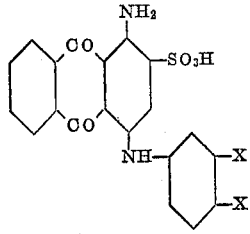

in which one X is $SO_3H$ and the other X is of the formula

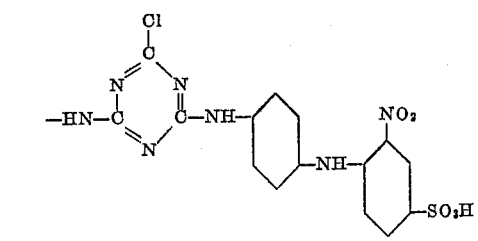

3. Anthraquinone dyestuff of the formula

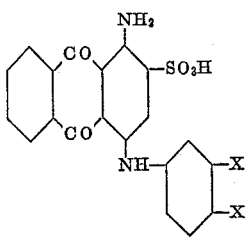

in which one X is —$SO_3H$ and the other X is of the formula

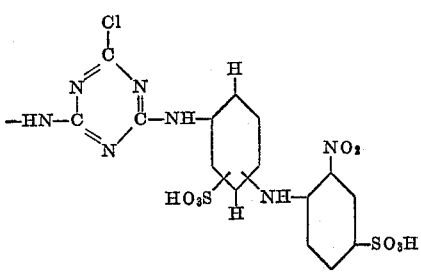

4. The dyestuff of the formula

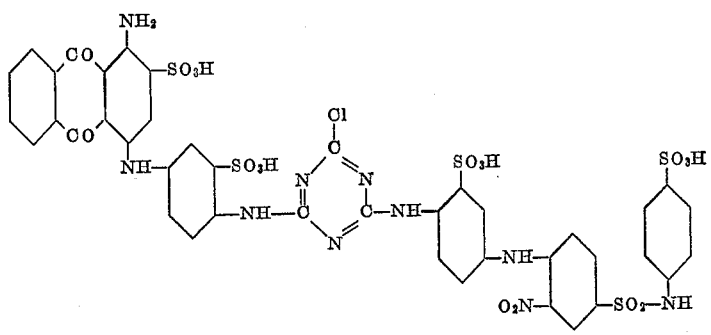

No references cited.